US011518926B2

(12) United States Patent
Reyes et al.

(10) Patent No.: US 11,518,926 B2
(45) Date of Patent: Dec. 6, 2022

(54) REMOVAL OF A MINERAL PHASE FROM A SURFACE ASSOCIATED WITH A WELLBORE

(71) Applicant: Halliburton Energy Services, Inc., Houston, TX (US)

(72) Inventors: Enrique A. Reyes, Tomball, TX (US); Kristina H. Holan, Cypress, TX (US); Antonio Recio, III, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 55 days.

(21) Appl. No.: 16/932,687

(22) Filed: Jul. 17, 2020

(65) Prior Publication Data

US 2022/0017812 A1   Jan. 20, 2022

(51) Int. Cl.
*C09K 8/532* (2006.01)
*C09K 8/06* (2006.01)

(52) U.S. Cl.
CPC .............. *C09K 8/532* (2013.01); *C09K 8/06* (2013.01)

(58) Field of Classification Search
CPC .......... C09K 8/06; C09K 8/524; C09K 8/528; C09K 8/532
See application file for complete search history.

(56) References Cited

U.S. PATENT DOCUMENTS

| 3,706,669 | A | 12/1972 | Gardner |
| 3,951,827 | A | 4/1976 | Burroughs |
| 4,096,869 | A | 6/1978 | Lawson |
| 5,026,481 | A | 6/1991 | Paul |
| 5,685,918 | A | 11/1997 | Tate |
| 6,331,513 | B1 | 12/2001 | Zaid |
| 6,494,218 | B1 | 12/2002 | Zaid |

(Continued)

FOREIGN PATENT DOCUMENTS

| CN | 106867490 | | 6/2017 |
| WO | 199011972 | A1 | 10/1990 |

(Continued)

OTHER PUBLICATIONS

International Search Report and Written Opinion dated Apr. 14, 2021 in related PCT Application No. PCT/US2020/043443 filed Jul. 24, 2020.

(Continued)

*Primary Examiner* — Alicia Bland
(74) *Attorney, Agent, or Firm* — K&L Gates LLP (57) ABSTRACT

The compositions for removing a mineral phase from a surface composition for removing a mineral phase of inorganic sulfate scale include a phosphonoalkyl aminopolycarboxylic acid chelating agent; a wettability modifier comprises a dibasic ester and a surfactant, wherein the surfactant comprises one or more of an anionic alkyl sulfonate or an anionic aryl sulfonate; a pH-adjusting agent; a scale converting agent; and water. The methods for removing a mineral phase from a surface include contacting the mineral phase with an aqueous dissolver fluid that is one of the present compositions; and removing the oil wet mineral phase from the surface with the aqueous dissolver fluid. The compositions and methods provide enhanced remediation of mineral phases from surfaces associated with wellbores.

12 Claims, 3 Drawing Sheets

(56) References Cited

U.S. PATENT DOCUMENTS

| | | |
|---|---|---|
| 7,470,330 B2 | 12/2008 | Keatch |
| 9,783,728 B2 | 10/2017 | Mahmoud et al. |
| 9,896,615 B2 | 2/2018 | Mason |
| 10,214,677 B2 | 2/2019 | Panamarathupalayam et al. |
| 2004/0087449 A1* | 5/2004 | Furman ............... C09K 8/524 507/200 |
| 2013/0196885 A1* | 8/2013 | Pabalan ............... C09K 8/86 507/239 |
| 2014/0296113 A1 | 10/2014 | Reyes et al. |
| 2015/0175872 A1 | 6/2015 | Bertkau |
| 2018/0037805 A1 | 2/2018 | Utschig-Samuels |
| 2018/0273827 A1* | 9/2018 | Beuterbaugh .......... C09K 8/528 |
| 2018/0320060 A1 | 11/2018 | Holtsclaw |
| 2018/0327653 A1 | 11/2018 | Palla-Venkata |
| 2019/0071597 A1 | 3/2019 | Purdy |

FOREIGN PATENT DOCUMENTS

| | | |
|---|---|---|
| WO | 2014149683 A1 | 9/2014 |
| WO | 2016100813 A1 | 6/2016 |
| WO | WO-2017217965 A1 * | 12/2017 ............. C09K 8/506 |
| WO | 2018/111229 A1 | 6/2018 |
| WO | 2019041023 A1 | 3/2019 |
| WO | 2020018080 A1 | 1/2020 |
| WO | 2020101644 A1 | 5/2020 |
| WO | 2020101649 A1 | 5/2020 |

OTHER PUBLICATIONS

ScaleClean; Product used in Mexico, referred in SPE-190725-MS (2018).

* cited by examiner

REMOVAL OF A MINERAL PHASE FROM A SURFACE ASSOCIATED WITH A WELLBORE

BACKGROUND

The present disclosure relates to methods and fluid compositions for enhanced remediation of mineral phases from surfaces associated with wellbores.

Operations to extract a subterranean product from the earth through a well often use treatment fluids to facilitate or implement the operations. Hydrocarbons, such as oil and gas, are subterranean products commonly extracted from reservoirs, areas of the earth that contain the hydrocarbons. A reservoir may be deep below the surface of the earth and the earth may include one or more formations that are above and/or make up the reservoir. A formation is a region of the earth with a distinct lithology describing the physical characteristics of the rock in the formation, such as mineral content.

Illustrative extraction operations may include, for example, drilling, completion, stimulation, and production. Stimulation operations may include, for example, fracturing and acidizing. In various operations, a treatment fluid is delivered downhole. For example, illustrative treatment fluids include fracturing fluids, cementing fluids, completion fluids, drilling mud, and production chemical fluids. Hydrocarbons are extracted or the treatment fluids delivered downhole using systems which may include surfaces, such as metal surfaces, for example conduits, pipelines, flowlines, or equipment, including downhole tools and devices. Other surfaces contacting fluids extracted from or introduced to downhole include mineral matrices, for example subterranean formations.

Inorganic scale may accumulate on surfaces during extractions and recovery operations. Inorganic scales form by substances precipitating onto the surfaces from fluids contacting the surfaces during extraction operations. Inorganic scales tend to create restrictions leading to artificial choking of the production tubing or liner, thus yielding reduced production and costly equipment damage. The severity of such scaling can accumulate to the point where flow essentially is no longer economically viable for continued operations, where continued equipment interventions are required if no remedial actions are taken to remove the scale. Inorganic scale formation in the wellbore area, pipelines, and equipment remains a production-restricting problem. This precipitation or crystallization, or accumulation, can take place in or within a fracture naturally present or artificially created (hydraulic fracturing, "fracking"). Under certain circumstances the proppant pack placed, whether in a hydraulic fracture or a frac-pac, can experience scaling. In other operations, the scaling can take place in or within the reservoir itself when the well is an injector well. In such a case, the scaling may occur due to the introduction of improperly treated or conditioned water, and/or the processes associated with the introduction of an acidizing or another descaling treatment fluid. For example, formation damage may occur when an incorrect or inadequate fluid is first introduced into a well or reservoir and then contacted by a an acidizing or descaling fluid having incompatible physico-chemical characteristics.

The inorganic scale is typically oil-wet in a producing well, making it difficult to efficiently achieve near complete dissolution (>90%) with an aqueous-based dissolver fluid without incurring extended time periods (for example days) and the need for organic solvent flush or wash steps or stages before applying an aqueous dissolver fluid in order to remove the scale. Further, conventional processes of removing scale tend to involve flushing (a step referred as post-flush) with a sufficiently strong mineral acid such as hydrochloric acid, or a strong organic acid such methanesulfonic acid, or in other instances formic acid, or acetic acid after applying the aqueous dissolver fluid in order to remove the scale.

BRIEF DESCRIPTION OF THE DRAWINGS

Embodiments of removal of a mineral phase from a surface associated with a wellbore are described with reference to the following figures. The same numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

The present disclosure provides compositions and methods of removing a mineral phase from a surface. The compositions and methods involve an aqueous dissolver fluid including a phosphonoalkyl aminopolycarboxylic acid chelating agent, a wettability modifier, a pH-adjusting agent, a scale converting agent and water. The wettability modifier includes a dibasic ester and an anionic alkyl sulfonate or an anionic aryl sulfonate. In one or more embodiments, the wettability modifier includes an alcohol. The compositions and methods do not require use of a secondary mineral or organic acid step for removing the mineral phase. That, the methods may include only contacting the mineral phase with the compositions in a single step dissolving process. The compositions and methods are capable of achieving at least 50% or more, for example at least 75%, such as at least 90%, dissolution of the mineral phase in a contact period between 0.5 and 72 hours, for example between 0.5 and 8 hours, such as between 0.5 and 6 hours.

Mineral Phase on a Surface

The mineral phase may include scale deposit, or formation material having the geochemical make-up of the reservoir, or mineral artificially or purposefully introduced into a subterranean formation or wellbore. In other instances, the specific origin of the mineral phase to be removed may be uncertain. The scale deposit may be an inorganic scale. The inorganic scale may be an inorganic sulfate scale. The inorganic sulfate scale may be any metal sulfate such as, calcium sulfate polymorphs such as gypsum, anhydrite, basanite or hemihydrate, or other sulfate divalent minerals containing magnesium, barium, or strontium. Other metals that may be in the inorganic sulfate scale include aluminum, iron, titanium, zirconium, cobalt, copper, zinc, or manganese. Other, less common metals includes lithium, beryllium, vanadium, scandium chromium, cadmium, silver, lead, bismuth, or antimony.

The mineral phase is disposed on a surface associated with a wellbore. The surface may be a metallic surface. For example the surface may be a surface of a conduit, such as the casing, production tubing, liner, marine riser, umbilical, chemical injection line, a surface of a pipeline, a surface of a flow line; or a surface of equipment, including downhole tools and devices such as electro-submersible pumps (ESP), valves, manifolds, inflow control devices, gauges, or mandrels. Alternately, surface may be a non-metallic surface, such as in an open-hole (OH) with or without a liner, or a plastic pipe surface. The non-metallic surface may be a mineral matrix, where the mineral phase may make up part or all of the matrix, such as a geologic subterranean formation. Furthermore, the mineral phase may be located or deposited on the 'topside' elements or configuration of an offshore structure, where some of the elements enunciated are present but others have not been specifically listed and are located above the water line. The configuration of a topside refers to equipment for drilling, production and processing of hydrocarbon and fluids extracted and transported from the subterranean formation. The platform or operation includes maritime structures such as FPSO (Floating Production Storage and Offloading) and semi-submersible.

System

Types of wells include those that are hydrocarbon (oil and/or gas) producers, geothermal, injectors (water) for pressure support including steam-assisted gravity drainage (SAGD) or water alternating gas (WAG) type, or for disposal. The surface is a surface of the well such as a wellbore, casing, a liner, tubing, flowline, surface pipeline, or surface equipment such as separators, heat exchangers, tanks, or the like. In a subsea case there can be several configurations. For example, scale can happen in the flowline above the subsea wellhead, below the wellhead at perforation zone, or above the perforation zone where there are mandrels, manifolds, other equipment. Scale can happen in the flowline above the subsea wellhead, below the wellhead in the perforation zone, or above the perforation zone where there are mandrels, manifolds, or the like.

Figure 1:
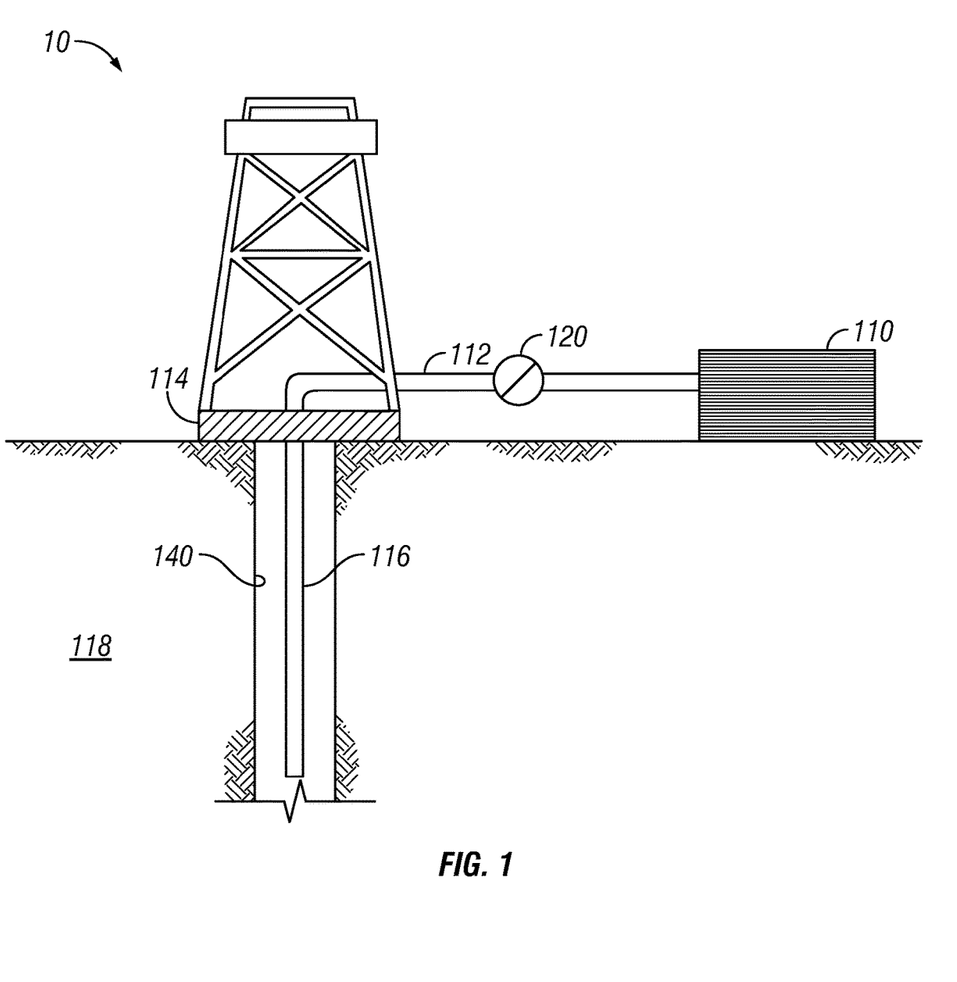
FIG. 1 depicts an system configured for delivering various dissolver fluids to a downhole location according to one or more embodiments.

FIG. 1 shows an illustrative schematic of a system that can deliver the dissolver fluid of the present disclosure to the surface with the inorganic scale, according to one or more embodiments. The surface may be at a downhole location. The term "downhole" as used herein refers to under the surface of the earth, such as a location within or fluidly connected to a wellbore. It should be noted that while FIG. 1 generally depicts a land-based system, it is to be recognized that like systems may be operated in subsea locations as well. As depicted in FIG. 1, system 10 may include mixing tank 110, in which the fluids of the embodiments herein may be stored or formulated. The fluids may be conveyed via line 112 to wellhead 114, where the fluids enter tubular 116, tubular 116 extending from wellhead 114 into subterranean formation 118. Tubular 116 is illustrative of production tubing. Upon being ejected from tubular 116, the fluids may subsequently penetrate into subterranean formation 118. Pump 120 may be configured to raise the pressure of the fluids to a desired degree before introduction into tubular 116.

Figure 2:
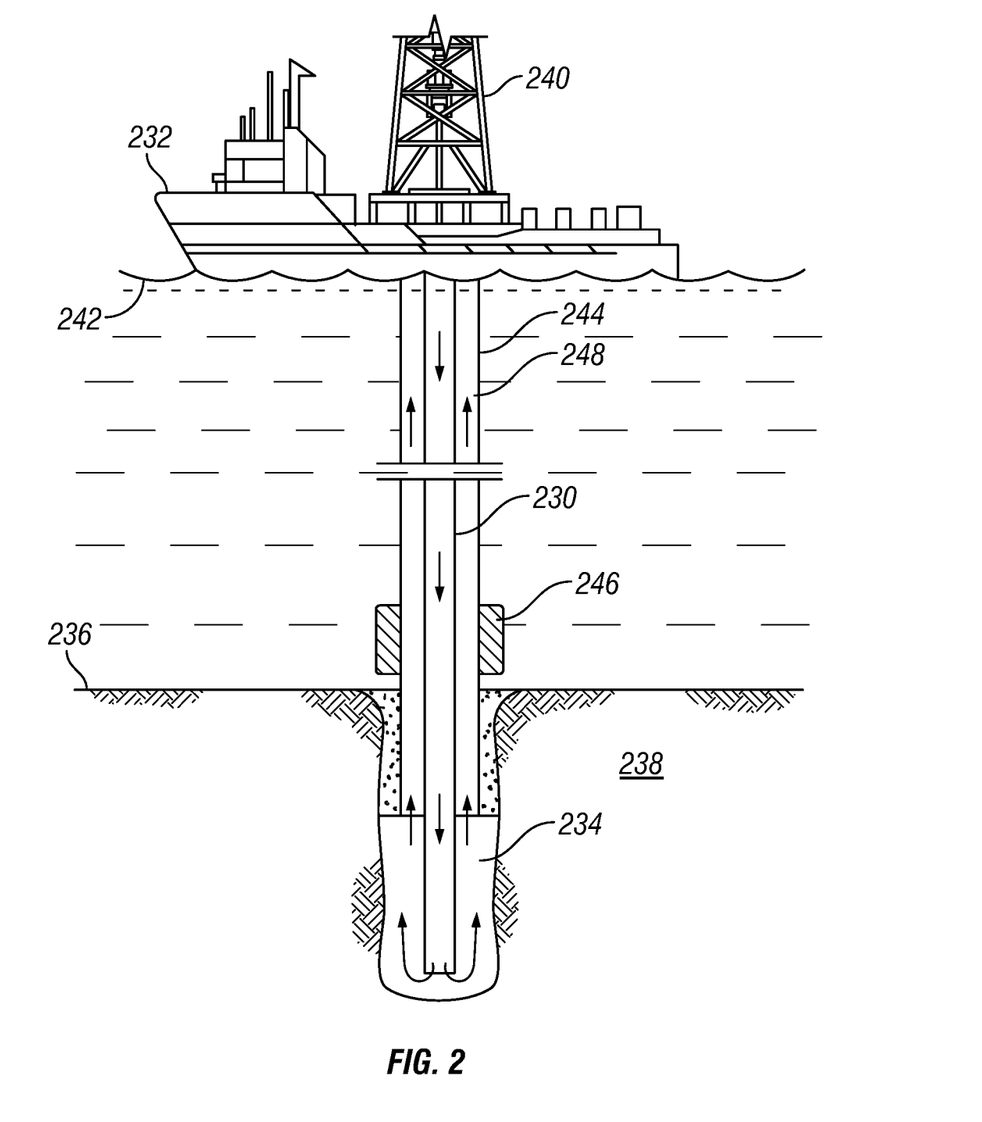
FIG. 2 depicts a system configured for delivering various dissolver fluids to a subsea downhole location according to one or more embodiments.

FIG. 2 shows an illustrative schematic of a subsea riser structure in fluid communication with a subterranean formation. As shown in FIG. 2, tubular 230 extends from platform or ship 232 into wellbore 234, which extends below seabed 236 and penetrates subterranean formation 238. Rig 240 resides upon platform or ship 232 above waterline 242. Subsea riser extends between platform or ship 232 and wellbore 234, spanning at least the distance between waterline 242 and seabed 236 and also passing through blowout preventer 246. Tubular 230 resides within subsea riser structure 244, and annulus 248 is defined therebetween.

It is to be recognized that the systems depicted in FIGS. 1 and 2 are merely exemplary in nature and various additional components may be present that have not necessarily been depicted in FIG. 1 or FIG. 2 in the interest of clarity. The dissolver fluid may be used to contact inorganic scale on the surface of above group pipeline or other equipment at above ground locations wherever inorganic scale can form upstream of a well or locations downhole. Non-limiting additional components that may be present include casing, supply hoppers, valves, condensers, adapters, joints, gauges, sensors, compressors, pressure controllers, pressure sensors, flow rate controllers, inflow control device, dissolvable devices, flow rate sensors, temperature sensors, marine riser, umbilical, chemical injection line, a subsea flow line, electrosubmersible pumps (ESP), manifolds, and inflow control devices. Delivery of the dissolver fluid is via components that permit the dissolver fluid to be injected. For example, the dissolver fluid may be injected through the main line, i.e., the flowline that transports hydrocarbon and fluids of the well into a collection facility. Alternatively, for example the dissolver fluid may be injected using coiled tubing.

Figure 3:
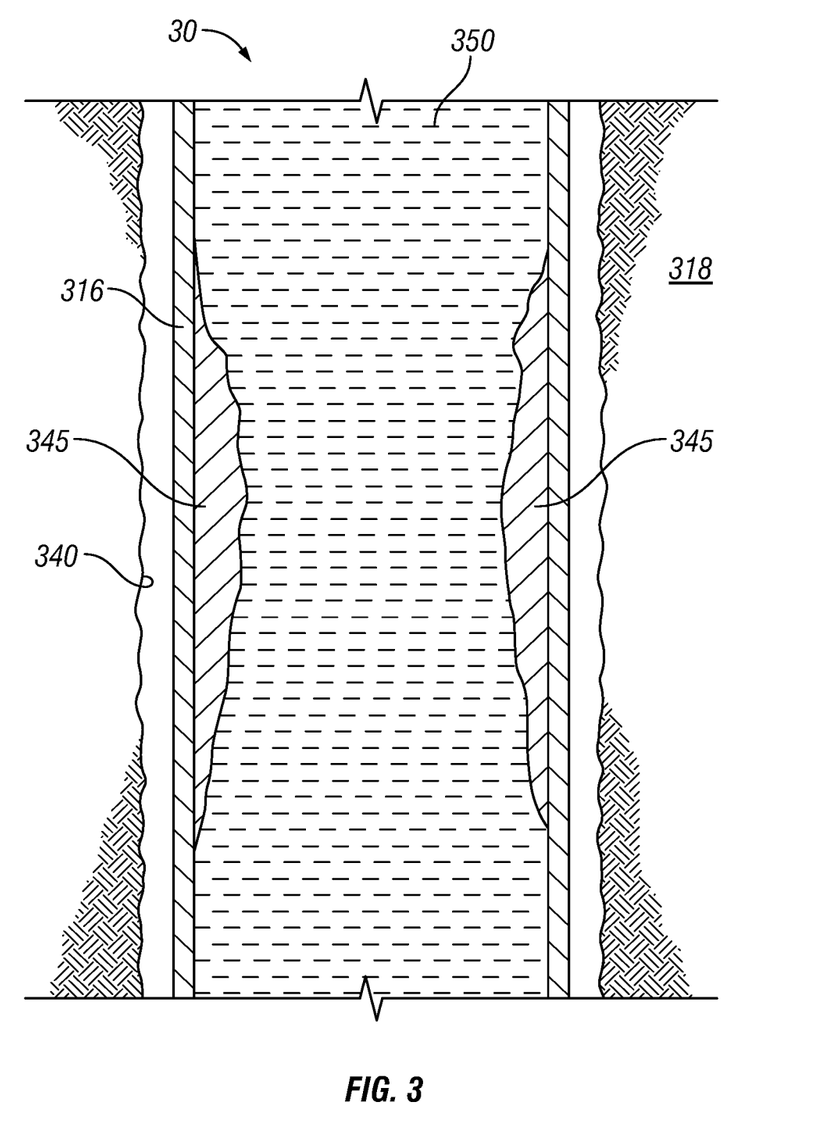
FIG. 3 is a schematic illustrating a downhole portion of the example dissolver fluid delivery system illustrated in FIG. 1 or FIG. 2 in accordance with one or more of the embodiments.

FIG. 3 is a schematic illustrating a downhole portion 30 of the example dissolver fluid delivery system 10 illustrated in FIG. 1. As illustrated, tubular 316 is disposed within the wellbore 340 and comprises inorganic scale 345. Tubular 316 is illustrative of production tubing. In some examples, inorganic scale 345 may restrict fluid flow through tubular 316. In the illustrated example, inorganic scale 345 is disposed on the interior of tubular 316. In some examples, inorganic scale 345 may be disposed on the exterior of tubular 316. Dissolver fluid 350 is pumped into tubular 316 to the target location in which the inorganic scale 345 is disposed. Dissolver fluid 350 may be pumped to the target location via any method as would be readily apparent to one of ordinary skill in the art. Dissolver fluid 350 may be conveyed to the target location via tubular 316, via an annulus between tubular 316 and the wall of subterranean formation 318, or via an annulus between tubular 316 and a conduit concentric with tubular 316. When placed at the target location, dissolver fluid 350 may be allowed to remain static. The well does not need to be shut in or sealed as dissolver fluid 350 contacts metal sulfate scale 345, although the well may be shut in or sealed if desired. By remaining "static," it is to be understood that the pumping of dissolver fluid 350 is halted and dissolver fluid 350 is not circulated in the wellbore 340. Dissolver fluid 350 may then contact metal sulfate scale 345 and dissolve at least a portion of inorganic scale 345 for a desired reaction time.

Dissolver Fluid

The compositions for removing a mineral phase from a surface are dissolver fluids that include a phosphonoalkyl aminopolycarboxylic acid chelating agent, a wettability modifier comprising an anionic alkyl sulfonate and/or anionic aryl sulfonate surfactant, a base fluid, a pH-adjusting agent, a scale converting agent and an optionally a synergistic agent. N-(phosphonomethyl) iminodiacetic acid (PMIDA) is an example of a phosphonoalkyl aminopolycarboxylic acid chelating agent. In particular, PMIDA has phosphonic $(R-(CH_2)_x-(O)P(OH)_2)$ and aminocarboxylic $(R-N-(CH_2)_x-C(O)(OH)_2)$-functional groups. Linear alkyl benzene sulfonate surfactants are illustrative of anionic salts that are both an anionic alkyl sulfonate surfactant and an anionic aryl sulfonate surfactant.

The dissolver fluid may be formed by combining a chelating agent fluid with a wettability modifier in the presence of a pH-adjusting agent and a scale converting agent. The chelating agent fluid may include the chelating agent, one or more other components, and water as a base fluid. Water may also be the base fluid of the dissolver fluid. The dissolver fluid may alternately be formed by combining the chelating agent, the wettability modifier, one or more other components, and water as a base fluid.

The dissolver fluid does not require use of a secondary mineral or organic acid step for removing the mineral phase. That is, the methods of removing a mineral phase with the dissolver fluid may include only contacting the mineral phase with the compositions in a single step dissolving process. A person skilled in the art will understand that the dissolver fluid may be used in a method of removing a mineral phase that includes other process stages that may occur in some instances, such as a post-flush or displacement fluid, where there may be multiple cycles of the single step process, for example n steps with new, fresh, treatment fluid, where n is an integer at least 2.

The dissolver fluid is effective for achieving at least 50% or more, for example at least 75%, such as at least 90%, dissolution of the mineral phase in a contact period between 0.5 and 72 hours, for example between 0.5 and 8 hours, such as between 0.5 and 6 hours. A person skilled in the art will understand that characteristics encountered in a well may act to circumscribe the effect of the dissolver fluid. Dissolving at least 90% or at least 75% of the calcium sulfate scale is achievable within the limits of inspection or physical verification, which is only indirectly measured or detected from a response by comparing the production index, or productivity, or another parameter such as temperature within the wellbore or by the pressure drop along the production string, or in more stringent processes a video camera image of the wellbore. Hence the dissolution may be at least 90% or at least 75% as per specification and data validation, while in field circumstances the dissolvable amount may be at least 50% due to insufficient mass surface contact, for instance. The lower dissolution capacity is not a consequence of the fluid properties but of the field and operational conditions.

Chelating Agent

The chelating agent is capable of chelating a metal ion in the mineral phase. Metal ions that the chelating agent may chelate include group 2 or IIA (alkaline earth), 13 or IIIA, and transition metals (Group 3 through 12). Chelation involves formation of two or more metal-ligand bonds, where the chelating agent is a multidentate ligand. In one or more embodiments, the chelating agent is a phosphonoalkyl aminopolycarboxylic acid chelating agent. The chelating agent is present in the dissolver fluid in an amount effective for the dissolver fluid to remove an amount of the mineral phase. For example, the dissolver fluid containing the chelating agent may remove at least 50% of the mineral phase, for example at least 75% of the mineral phase, such as at least 90% of the mineral phase. For example the chelating agent may be present in the amount of 5-40 wt. % in the dissolver fluid. In one or more embodiments, the chelating agent has some measure of biodegradability.

In one or more embodiments, the chelating agent is a phosphonoalkyl chelating agent, that is a chelating agent that includes a phosphonoalkyl moiety. The chelating agent may be an organic compound. Thus, the phosphonoalkyl chelating agent may be a phosphonoalkyl organic compound, that is an organic compound that includes a phosphonoalkyl moiety. Suitable organic compounds including a phosphonoalkyl moiety include n-(phosphonomethyl) iminodiacetic acid (PMIDA), or salts thereof, N-(carboxymethyl)-N-(phosphonomethyl)glycine, glycine, N,N'-1,2-ethanediylbis(N-(phosphonomethyl), glyphosine; aminotrimethylene phosphonic acid, sodium aminotris(methylenephosphonate), N-(2-hydroxyethyl)iminobis (methylphosphonic acid), phosphonic acid, P,P'-((2-propen-1-ylimino)bis(methylene))bis-; phosphonic acid, P,P',P''-(nitrilotris(methylene))tris-; (nitrilotris(methylene)) trisphosphonic acid; ((methylimino)dimethylene) bisphosphonic acid; phosphonic acid, P,P',P''',P''''-(oxybis(2, 1-ethanediylnitrilobis(methylene))tetrakis-; ((propylimino) bis(methylene))diphosphonic acid; phosphonic acid, P,P',P''-(nitrilotris(methylene))tris-; (ethylenedinitrilo)-tetramethylenephosphonic acid; ethylenebis (nitrilodimethylene)tetraphosphonic acid; (ethylenebis (nitrilobis(methylene)))tetrakisphosphonic acid; tetrasodium tetrahydrogen (ethane-1,2-diylbis(nitrilobis (methylene)))tetrakisphosphonate; 6-(bis(phosphonomethyl) amino)hexanoic acid; (phenylmethyl)imino)bis(methylene)bisphosphonic acid, phosphonobutane tricarboxylic acid, 2-hydroxyphosphono dicarboxylic acid; a sodium, potassium, or ammonium salt of any group member herein, and mixtures thereof, and any combination thereof.

In one or more embodiments, the chelating agents including a phosphonoalkyl moiety have the following structure:

$R^1$ may be selected from the group consisting of: a ($C_1$ to $C_{10}$) alkyl, a ($C_1$ to $C_{10}$) alkenyl, a ($C_1$ to $C_{10}$) alkynyl, an acyl, an aryl, acetate, a carboxyl, a hydrogen atom, and a phosphonate. $R^2$ may be selected from the group consisting of: a ($C_1$ to $C_6$) alkyl, a ($C_1$ to $C_{10}$) alkenyl, a ($C_1$ to $C_{10}$) alkynyl, an acyl, an aryl, acetate, a carbonyl, a hydrogen atom, a phosphonate, or a phosphonoalkylamine. $R^3$ may be selected from the group consisting of: a ($C_1$ to $C_{10}$) alkyl, a ($C_1$ to $C_{10}$) alkenyl, a ($C_1$ to $C_{10}$) alkynyl, an acyl, an aryl, acetate, a hydrogen atom, and a phosphonoalkylamine. $R^4$ and $R^5$ each may be independently selected from the group consisting of: a ($C_1$ to $C_{10}$) alkyl, a ($C_1$ to $C_{10}$) alkenyl, a ($C_1$ to $C_{10}$) alkynyl, an acyl, an aryl, acetate, H, Li, Na, K, Cs, $NH_4$, or a phosphonoalkylamine. In one or more embodiments, "x" may be an integer in the range from about 1 to about 6. In one or more embodiments, "y" may be an integer in the range from about 0 to about 6. In one or more embodiments, "z" may be an integer in the range from about 0 to about 6.

In one or more embodiments, the chelating agent including a phosphonoalkyl moiety may comprise a metallated diacetoaminophosphonate. As used herein, the term "metallated" refers to the conjugate base form of the species where the metal is one of Group 1, 2, 3 or a divalent, trivalent or quadrivalent cationic or positively charged ionic species. In one or more embodiments, the organic compound comprising a phosphonoalkyl moiety may comprise a N-(phosphonoalkyl)iminodiacetic acid salt. In one or more embodiments, the organic compound comprising a phosphonoalkyl moiety may comprise a N-(phosphonomethyl)iminodiacetic acid salt having the following structure:

$R^1$, $R^2$, $R^3$, and $R^4$ each may be independently selected from the group consisting of: H, Li, Na, K, Cs, Be, Mg, Ca, Sr, Ba, Cr, Fe, Mn, Co, Ni, Cu, Ga, In, $NH_4^+$, and any combination thereof. PMIDA effectively chelates agent a wide variety of metal ions with a range of stability constants.

In one or more embodiments, the chelating agents including a phosphonoalkyl moiety have the following structure:

$R^1$ may be selected from the group consisting of: a ($C_1$ to $C_{10}$) alkyl, a ($C_1$ to $C_{10}$) alkenyl, a ($C_1$ to $C_{10}$) alkynl, an acyl, an aryl, acetate, a carboxyl, a hydrogen atom, and a phosphonate. $R^2$ may be selected from the group consisting of: a ($C_1$ to $C_6$) alkyl, a ($C_1$ to $C_{10}$) alkenyl, a ($C_1$ to $C_{10}$) alkynl, an acyl, an aryl, acetate, a carbonyl, a hydrogen atom, a phosphonate, or a phosphonoalkylamine. $R^3$ may be selected from the group consisting of: a ($C_1$ to $C_{10}$) alkyl, a ($C_1$ to $C_{10}$) alkenyl, a ($C_1$ to $C_{10}$) alkynl, an acyl, an aryl, acetate, a hydrogen atom, and a phosphonoalkylamine. $R^4$ and $R^5$ each may be independently selected from the group consisting of: a ($C_1$ to $C_{10}$) alkyl, a ($C_1$ to $C_{10}$) alkenyl, a ($C_1$ to $C_{10}$) alkynl, an acyl, an aryl, acetate, H, Li, Na, K, Cs, Be, Mg, Ca, Sr, Ba, Cr, Fe, Mn, Co, Ni, Cu, Ga, In, $NH_4$, or a phosphonoalkylamine. In one or more embodiments, "x" may be an integer in the range from about 1 to about 6. In one or more embodiments, "y" may be an integer in the range from about 0 to about 6. In one or more embodiments, "z" may be an integer in the range from about 0 to about 6.

In one or more embodiments the chelating agent is an aminocarboxylic acid chelating agent. As used herein, the term "aminopolycarboxylic acid" chelating agent refers to a compound having one or more amino groups and two or more carboxylic acid groups, any salt of such an acid, any derivative of such an acid, or any combination thereof. Suitable aminopolycarboxylic acid chelating agents having some measure of biodegradability include glutamic diacetic acid (GLDA), methylglycine diacetic acid (MGDA), β-alanine diacetic acid (β-ADA), ethylenediaminedisuccinic acid, S,S-ethyl enediaminedi succinic acid (EDDS), iminodisuccinic acid (IDS), hydroxyiminodisuccinic acid (HIDS), polyamino disuccinic acids, N-bis[2-(1,2-dicarboxyethoxy)ethyl]glycine (BCA6), N-bis[2-(1,2-dicarboxyethoxy)ethyl]aspartic acid (BCA5), N-bis[2-(1,2-dicarboxyethoxy)ethyl]methylglycine (MCBA5), N-tris[(1,2-dicarboxyethoxy)ethyl]amine (TCA6), N-bis[2-(carboxymethoxy)ethyl]glycine (BCA3), N-bis[2-(methylcarboxymethoxy)ethyl]glycine (MCBA3), N-methyliminodiacetic acid (MIDA), iminodiacetic acid (IDA), N-(2-acetamido)iminodiacetic acid (ADA), hydroxymethyl-iminodiacetic acid, 2-(2-carboxyethylamino) succinic acid (CEAA), 2-(2-carboxymethylamino) succinic acid (CMAA), diethylenetriamine-N,N''-disuccinic acid, triethylenetetramine-N,N'''-disuccinic acid, 1,6-hexamethylenediamine-N,N'-disuccinic acid, tetraethylenepentamine-N,N''''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-di succinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl) aspartic acid, N-[2-(3-hydroxysuccinyl)]-L-serine, aspartic acid-N, N-diacetic acid, aspartic acid-N-monoacetic acid, any salt thereof, any derivative thereof, or any combination thereof. Particularly suitable biodegradable chelating agents that may be used in a dissolver fluid include, for example, MGDA, GLDA, EDDS, -ADA, IDS, TCA6, BCA3, BCA5, BCA6, MCBA3, and MCBA5. In one or more embodiments, additional chelating agents such as, for example, ethylenediaminetetraacetic acid (EDTA), propylenediaminetetraacetic acid (PDTA), nitrilotriacetic acid (NTA), N-(2-hydroxyethyl)ethylenediaminetriacetic acid (HEDTA), diethylenetriaminepentaacetic acid (DTPA), hydroxyethyliminodiacetic acid (HEIDA), cyclohexylenediaminetetraacetic acid (CDTA), diphenylaminesulfonic acid (DPAS), ethylenediamined(o-hydroxyphenylacetic) acid (EDDHA), any salt thereof, any derivative thereof, or the like may be included in the dissolver fluid.

In one or more embodiments, the chelating agent is selected from combinations of any of the chelating agents described herein.

In one or more embodiments, one or more chelating agents may be added to the dissolver fluid separately from the wettability modifier composition. In such embodiments, the dissolver fluid may include the chelating agent in an amount from about 0.005 wt. % to about 60 wt. % by volume of the base fluid in the treatment fluid. In one or more embodiments, the dissolver fluid may include one or more wettability modifiers of the present disclosure in an amount from about 0.01 wt. % to about 40 wt. % by volume of the base fluid. In one or more embodiments, the dissolver fluid may include one or more wettability modifier compositions of the present disclosure in an amount from about 0.05 wt. % to about 20 wt. % by volume of the base fluid. In one or more embodiments, the dissolver fluid may include one or more wettability modifier compositions of the present disclosure in an amount from about 0.05 wt. % to about 5 wt. % by volume of the base fluid.

In one or more embodiments, the chelating agents may be added to the aqueous phase of the wettability modifier composition, and the wettability modifier composition may in turn be added to the dissolver fluid. In such embodiments, the aqueous phase of the wettability modifier composition may include the chelating agent including a chelating agent in an amount from about 0.005 wt. % to about 10 wt. % by volume of the aqueous phase. In one or more embodiments, the aqueous phase of the wettability modifier compositions may include one or more wettability modifier compositions of the present disclosure in an amount from about 0.01 wt.

% to about 5 wt. % by volume of the aqueous phase. In one or more embodiments, the aqueous phase of the wettability modifier compositions may include one or more surfactant compositions of the present disclosure in an amount from about 0.05 wt. % to about 2 wt. % by volume of the aqueous phase.

Wettability Modifier

The wettability modifier is capable of converting the surface of the mineral phase from oil-wet to water-wet. The wettability modifier is present in the dissolver fluid in an amount effective to improve the removal of the mineral phase by the dissolver fluid as compared to a reference dissolver fluid that is the same except for omitting the wettability modifier. For example the wettability modifier may be present in the amount of 0.1 to 2% v/v in the dissolver fluid. The improvement may be in the amount of time that the dissolver fluid takes to dissolve an amount of the mineral phase, for example the amount of time to dissolve an amount of the mineral phase.

The wettability modifier is effective for the dissolver fluid achieving at least 50% or more, for example at least 75%, such as at least 90%, dissolution of the mineral phase in a contact period between 0.5 and 72 hours, for example between 0.5 and 8 hours, such as between 0.5 and 6 hours.

The wettability modifier may include a non-ionic or an anionic surfactant or combination of non-ionic and/or ionic surfactants. A non-ionic species does not dissociate into its ionic species in for instance a neutral pH aqueous solution. As used herein, "anionic," and "non-ionic" are used to describe the organic portion of an organic molecule or salt thereof. An "ionic" organic portion would form an ionic bond with another element or another portion of the molecule. It should be understood that "anionic" is a type of ionic species. Non-ionic surfactants contain covalently bonded oxygen-containing hydrophilic head that are bonded to hydrophobic tail where the latter bond more to hydrocarbons and the former bond more with water. Anionic surfactants are organic substances that when dissolved in water, negatively charged particles called anions are created. These anionic surfactants have negatively charged hydrophilic ends that are used to attract water.

The wettability modifier may be an emulsion. The emulsion may be a microemulsion. The microemulsion may have a size of the droplets of an inner phase of the emulsion in an outer phase of the emulsion being about 0.001 microns to about 1,000 microns, about 1 micron to about 1,000 microns, or about 1 micron to about 100 microns. The emulsion may be a nanoemulsion. The nanoemulsion may have a size of the droplets of the inner phase of the emulsion in the outer phase of the emulsion being about 1 nm to about 1000 nm, about 5 nm to about 200 nm, or about 10 nm to about 100 nm.

The wettability modifier may be a non-emulsifier. Non-emulsifiers are employed to reduce the tendency for emulsion formation by reducing the interfacial tension between hydrocarbon and water. These emulsions can clog formations making it difficult to contact the mineral phase with the chelating agent fluid. The use of non-emulsifiers can be used to break any emulsions up that may have formed on the mineral surface.

When the wettability modifier includes a diethanolamide of a TOFA or an ethoxylated ester of a TOFA, the TOFA may be an alkanolamide surfactant that is a (C1-C50)hydrocarbyl amide having groups R1 and R2 substituted on the amide nitrogen, wherein R1 and R2 are each independently selected from the group consisting of —H, —(C1-C50) hydrocarbyl, and —(C1-C50)hydrocarbylene-OH, wherein at least one of $R^1$ and $R^2$ is —(C1-C50)hydrocarbylene-OH. An alkanolamide surfactant that has the structure:

where $R^3$ is a substituted or unsubstituted (C12-C25)hydrocarbyl of a tall oil fatty acid having the structure $R^3$—C(O)—OH, and $R^1$ and $R^2$ are each independently —(C1-C10)alkylene-OH. For example, $R^3$ is a substituted or unsubstituted (C16-C18) hydrocarbyl of a tall oil fatty acid having the structure $R^3$—C(O)—OH The term "substituted" as used herein in conjunction with a molecule or an organic group as defined herein refers to the state in which one or more hydrogen atoms contained therein are replaced by one or more non-hydrogen atoms. Both wettability modifiers 1 and 2 used in the examples contain a Tall Oil Fatty Acid (TOFA) diethanolamide intermediate. The TOFA intermediate is believed to have superior interfacial tension reduction as well as phase resolving properties. TOFA has been used in previous applications as flowback aids and treatment fluids for both formations and produced oil.

It will be understood that a component of the wettability modifier may be described with specificity by a class of compounds with the additional description of a quantitative value, for example value of a parameter such as HLB, RSN, or KB. For example, it will be understood that each of the following descriptions are of the type know to those skilled in the art: diethanolamide of TOFA (HLB 7), ethoxylated Sorbital alcohol (RSN 16), emulsified 9-decenoic acid methylester (KB 85); with an ethoxylated secondary alcohol (HLB 12), diethanolamide of TOFA (HLB 7), ethoxylated ester of TOFA (HLB 14), ethoxylated phenol formaldehyde resin (RSN 11), tridecyl alcohol (HLB 9), C12-C16 ethoxylated alcohol (HLB 12), glycerol initiated polyol (RSN 16), NPE-nonylphenyl ethoxylate oligomer (HLB 9), or resin alkoxylate (RSN 13). C12-16 indicates 12-16 carbon atoms. HLB is hydrophilic-lipophilic balance which is a measure of the degree to which a surfactant is hydrophilic or lipophilic, with lower numbers indicating increased lipophilicity and higher numbers indicating increased hydrophilicity. Its determination is known to those skilled in the art, such as by Griffin's method or Davies' method (Griffin W. C.: Classification of Surface-Active Agents by HLB, Journal of the Society of Cosmetic Chemists 1 (1949): 311; Griffin W. C.: Calculation of HLB Values of Non-Ionic Surfactants, Journal of the Society of Cosmetic Chemists 5 249 (1954): 249; Davies, J. T., A Quantitative Kinetic Theory of Emulsion Type. I. Physical Chemistry of the Emulsifying Agent, Gas/Liquid and Liquid/Liquid Interface, Proceedings of the International Congress of Surface Activity (1957): 426-438). RSN is relative solubility number which is a measure of relative surfactant solubility in water and in oil, with lower numbers indicating increased oil solubility and higher numbers indicating increased water solubility. Its determination is known to those skilled in the art, for example by an empirical method of adding a volume of water in milliliters to produce turbidity in a composition of 1 g of surfactant and 30 ml benzene/dioxane solvent (Jiangying Wu et al, Development of a method for measurement of relative solubility of nonionic surfactants, Colloids and Surfaces A: Physicochem. Eng. Aspects 232 (2004): 229). KB is kauri-butanol value, which is a measure of the strength of a solvent. Its determination is known to those skilled in the art, for example by measuring the amount of solvent that can be added to kauri resin in butyl alcohol without causing cloudiness according to ASTM D1133 Standard Test Method for Kauri-Butanol Value of Hydrocarbon Solvents.

Wettability Modifier Formulation 1

In one or more embodiments, the wettability modifier includes a blend of an anionic surfactant, an alcohol, and water. The blend may optionally include a solvent, such as an organic solvent. The organic solvent may be an oil. The blend may additionally include water. The present inventors have discovered that wettability modifiers containing an anionic alkyl sulfonate or an anionic aryl sulfonate surfactant improve the performance of a phosphonoalkyl aminopolycarboxylic acid chelating agent chelating agent for removing the mineral phase. Further, the present inventors have discovered that anionic alkyl sulfonate or an anionic aryl sulfonate provides greater improvement when an organic solvent, for example a dibasic ester solvent, is included in the wettability modifier.

The anionic surfactant may include an anionic salt. The anionic salt may be an anionic alkyl sulfonate or an anionic aryl sulfonate. The anionic salt may be a linear alkyl benzene sulfonate salt, an alpha olefin sulfonate salt, an oleic sulfonate salt, a branched alkyl benzene sulfonate salt, a lauryl sulfate salt, an alkyl diphenyl oxide disulfonate salt, a combination alkyl aryl sulfonate (molecular weight 250-600) salt, an alkonoate salt, or combinations thereof. The salt may include a source of cation, for example one or more of triethyl amine, ispropylamine, imine, or sodium. The cation may be monovalent, divalent, or higher valency. The alkyl diphenyl oxide disulfonate salt may be a C6-C18 diphenyl oxide disulfonate salt.

The solvent may be a dibasic ester. The solvent may be dimethyl 2-methylglutarate, methyl 9-decenoate, methyl 9-dodecenoate, N,N-dimethyl 9-decenamide, diethyl carbonate, triethyl citrate, dimethyl 2-methylglutarate, dodecyl acetate, 1-dodecyl-2-pyrrolidinone, 2-dodecyl-pyrrolidinone, N—$(C_2H_4)_n$$CH_3$-pyrrolidinone (wherein n is from about 1 to about 22), n-octyl-pyrrolidinone, dibutyl ether, isoamyl ether, di-n-amyl ether, dihexyl ether, heptyl ether, dioctyl ether, dodecyl ether, benzyl hexyl ether, di-n-alkyl-ethers having the formula O[$(CH_2)_x CH_3$]$_2$ (wherein x is from about 3 to about 35), a linear or branched dibasic ester having the formula $CH_3OC(O)(CH_2)_x C(O)OCH_3$ (wherein x is from about 2 to about 10), $CH_3OC(O)(CH_2)$—$CHCH_3 (CH_2)_y C(O)OCH_3$ (wherein x and y are each independently from about 2 to about 10), $CH_3OC(O)(CH_2)_x C(CH_3)_2 (CH_2)_y C(O)OCH_3$ (wherein x and y are each independently from about 2 to about 10), a linear or branched dibasic ester having structure or (wherein x and z are each independently from about 0 to about 10, wherein y is from about 0 to about 6, wherein each R is independently selected from the group consisting of methyl, ethyl, n-propyl, iso-propyl, n-butyl, and sec-butyl, and wherein $R_1$ is H or $CH_3$), or any combination thereof. In one or more embodiments, the solvent may include a linear dibasic ester, a branched dibasic ester, and combinations thereof. In one or more embodiments, the solvent may include one or more alkylesters of alkylated dibasic esters (Kb value 45-90). In one or more embodiments, the solvent may include one or more N-alkyl pyrrolidinones (Kb value 91-130). In one or more embodiments, the solvent may be include dimethyl 2-methylglutarate, 1-dodecyl-2-pyrrolidinone, N—$(C_2H_4)_n CH_3$-pyrrolidinone (wherein n is from about 6 to about 12), dimethyl succinate, dimethyl glutarate, dimethyl adipate, dimethyl-2-methyl adipate or combinations thereof.

The alcohol may be an alkyl alcohol, an aromatic alcohol, or combinations thereof. The alkyl alcohol may be one or more of methanol, ethanol, 1-propanol, 2-propanol, 1-butanol, 2-butanol, 3-butanol, and the like, or combinations thereof.

Wettability Modifier Formulation 2

In one or more embodiments, the wettability modifier includes a non-ionic blend of an alkanolamide and an alkoxylated alcohol, for example a blend containing a diethanolamide of a TOFA (HLB 7) and an ethoxylated sorbital alcohol (RSN 16), and water.

Wettability Modifier Formulation 3

In one or more embodiments, the wettability modifier includes a non-ionic microemulsion that is a blend of an emulsified 9-decenoic acid methylester (KB value 85), an ethoxylated secondary alcohol (HLB 12), a diethanolamide of a TOFA (HLB 7), an ethoxylated ester of a TOFA (HLB 14), an ethoxylated phenol formaldehyde resin (RSN 11), and a tridecyl alcohol (HLB 9), and water.

Wettability Modifier Formulation 4

In one or more embodiments, the wettability modifier includes a non-ionic non-emulsifier blend of a nonylphenyl ethoxylate (NPE) oligomer (HLB 9) and a resin alkoxylate (RSN 13), and water.

Wettability Modifier Formulation 5

In one or more embodiments, the wettability modifier includes a blend of a C12-C16 ethoxylated alcohol (HLB 12) and a glycerol initiated polyol (RSN 16), and water.

Base Fluid

The dissolver fluid is aqueous. The dissolver fluid may be free of water insoluble or water immiscible agents. Examples of suitable aqueous fluids include fresh water, saltwater, brine, seawater, and/or any other aqueous fluid that does not undesirably interact with the other components used in accordance with present embodiments or with the subterranean formation.

Other Components

The dissolver fluid further contains a pH adjusting agent and a scaling converting agent. In one or more embodiments, the dissolver fluid excludes synergist agents.

The pH adjusting agent provides a neutral or alkaline pH to the dissolver fluid. The pH-adjusting agent is a base, in particular a Bronsted base. The pH adjusting agent may be a strong base, that is a base that reaches full dissociation in water. The pH adjusting agent may be used to adjust the pH of the dissolver fluid to a value at least 7. The pH adjusting agent may be used to adjust the pH of the dissolver fluid to a value greater than 9. The pH adjusting agent may be used to adjust the pH of the dissolver fluid to a value up to 10. The pH adjusting agent may be a metal hydroxide such as lithium hydroxide, sodium hydroxide, cesium hydroxide, potassium hydroxide, or the like, or ammonium containing hydroxides, specifically NH$_4$OH, and quaternary ammonium hydroxides R$_4$NOH where R can be an alkyl group C1-C10. When used, the pH adjusting agent is present in the dissolver fluid in an effective amount to provide a neutral or alkaline pH to the dissolver fluid.

The scale converting agent converts scale into an alternate form. For example, the scale converting agent may convert calcium sulfate into a form with increased solubility in for example, the dissolver fluid, another treatment fluid, and/or acidic fluid. The scale converting agent may be a metal carbonate metal or bicarbonate of a Group 1 metal or NH$_4^+$. For example, the scale converting agent may be bicarbonate salt of sodium, potassium, lithium, cesium, or ammonium. When used, the scale converting agent is present in the dissolver fluid in an amount effective to convert scale into an alternate form.

Synergistic Agents

The dissolver fluid optionally further contains a synergistic agent. In one or more embodiments, the dissolver fluid excludes synergist agents. Alternately, in one or more embodiments, the dissolver fluid includes a synergist agent.

The synergist agent increases the scale dissolving activity of the dissolver fluid. The synergistic agent may be a complexing agent. Alternately or in combination, the synergistic agent may act as a catalyst. The synergistic agent may be a carboxylic or polycarboxylic acid such as a hydroxy(poly)carboxylic acids. Examples are acids, or respective metal salts, of oxalic, lactic, maleic, malonic, gluconic, glucaric, acetic, hydroxyacetic, citric, or glucoheptonic acid. The synergistic agent may be an organochloride. For example, the organochloride may be an organochloride of C2 or C3. The auxiliary agent may include anions of the halide, halocarboxylate, carboxylate, or other oxyanions. When used, the synergistic agent is present in the dissolver fluid in an amount effective to increase the scale dissolving activity of the dissolver fluid.

Methods

The methods for removing a mineral phase from a surface include contacting the mineral phase with the aqueous dissolver fluid and removing the mineral phase with the dissolver fluid. The dissolver fluid, that includes the wettability modifier as a wetting additive in combination with the complexing agent, modifies the wetting phase. The dissolver fluid, inclusive of the wetting additive, specifically circumvents disadvantageous wettability and therefore increases reactivity of oil-wet inorganic sulfate scale to the rest of the dissolver composition. These wettability modifiers act as both a wetting additive and penetrant, allowing for increased penetration of the complexing agent into the scale lattice, allowing for more dissolution than without the wettability modifiers. The methods may include removing a hydrocarbon phase from the mineral phase. Thus, the methods can be applied when the mineral phase is oil wet.

The combination of complexing agent and wettability modifier improves reactivity of oil-wetted inorganic scale to aqueous dissolver fluids. The surfactant reduces the interfacial tension between oil and water, thus decreasing capillary pressure. The surfactant may also alter rock wettability, making the formation water-wet or mixed-wet. Such interfacial tension reduction and/or altering of rock wettability allows the remainder of the dissolver fluid to be more effective. The present compositions, in comparison to scale dissolution compositions including a complexing agent fluid and excluding the wettability modifier wetting additive, improves the performance of the complexing agent fluid as a scale dissolver. The wetting additive is capable of modifying the wetting phase from oil-wet to water-wet, and allows the dissolver fluid to react in the less time than a corresponding scale dissolution composition excluding the wetting additive.

The methods of removing a mineral phase do not require use of a secondary mineral or organic acid step for removing the mineral phase. That is, the methods of removing the mineral phase may include only contacting the mineral phase with the compositions in a single step dissolving process. A person skilled in the art will understand that there are other process stages that may occur in some instances, such as a post-flush or displacement fluid. Further, there may be multiple cycles of the single step process, for example n steps with new, fresh, treatment fluid, where n is an integer at least 2.

The methods of removing the mineral phase a capable of achieving at least 50% or more, for example at least 75%, such as at least 90%, dissolution of the mineral phase in a contact period between 0.5 and 72 hours, for example between 0.5 and 8 hours, such as between 0.5 and 6 hours. A person skilled in the art will understand that characteristics encountered in a well may act to circumscribe the effect of the dissolver fluid. Dissolving at least 90% of the calcium sulfate scale is achievable within the limits of inspection or physical verification, which is only indirectly measured or detected from a response by comparing the production index, or productivity, or another parameter such as temperature within the wellbore or by the pressure drop along the production string, or in more stringent processes a video camera image of the wellbore. Hence the dissolution can be at least 90% as per specification and data validation, but in field circumstances the dissolvable amount may be at least 50% due to insufficient mass surface contact, for instance. The lower dissolution capacity is not a consequence of the fluid properties but of the field and operational conditions.

To perform these methods, well production may be temporarily suspended. The dissolver fluid may be applied wherever a mineral phase is present, contacting a partially or fully oil-wet inorganic sulfate scale containing mineral phase that is located or deposited on a surface or within a matrix. The dissolver fluid may be applied in subterranean formations having a temperature below the decomposition temperature of the chelating agent. For example, the decomposition temperature of PMIDA in its pure form is 204° C. (399° F.). When the methods are complete, evacuation of the dissolver fluid may vary. Production may be resumed and the dissolver fluid evacuated from the wellbore with produced hydrocarbon product. Alternatively, the dissolver fluid may be evacuated separately before startup.

The method and dissolver fluid composition also have the benefit of not requiring secondary fluid-addition step, such as a mineral acid like hydrochloric acid, or an organic acid of sufficient strength of acidity such as acetic acid, formic acid, methanesulfonic acid, to dissolve the by-product of the first step (calcium carbonate). The present disclosure thus provides for removal of the mineral phase in a single step dissolving process without the need to contact the mineral phase with a second organic or solvent wash or soak to manage the hydrocarbon contaminant or residue on the inorganic material.

The time it takes to dissolve the sulfate scale is temperature-dependent and can range from 0.5 hours to 72 hours. For example, if subterranean formation or equipment surface is at or above 200° F., it may take not more than two hours to remove scale, for example not more than one hour, for example not more than 0.5 hours. The compositions provide solutions that can reduce the treatment time, shut-in period, from the standard treatment time of 24 hours to two hours, for the dissolution of anhydrite ($CaSO_4$) scale. The efficiency gain by improving scale dissolution can translate to higher rates of equipment utilization. The proposed compositions shorten the duration of the dissolution time, which represents idle time. When the temperature is between room temperature and 200° F., it may take between 4 and 8 hours to remove scale. Room temperature is defined as 68-73° F.

The compositions and methods may apply to the descaling of geothermal wells, the dissolution of anhydrite in reservoir matrix, and/or the re-stimulation treatments in unconventional reservoirs. The reservoir mix may include fracture etching or matrix dissolution for selective stimulation. The re-stimulation treatments may include unconventional reservoirs where scaling is not limited to wellbore but due to the length of the wellbore and wellbore area is difficult to inject treatment volume that can reach any substantial area beyond the perforation zone.

One or more specific embodiments of the acidizing composition for improved fluid performance have been described. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

Certain terms are used throughout the description and claims to refer to particular features or components. As one skilled in the art will appreciate, different persons may refer to the same feature or component by different names. This document does not intend to distinguish between components or features that differ in name but not function.

Unless otherwise indicated, a numerical parameter "n" expressing quantities used in the present disclosure and associated claims means "about n." Accordingly, unless otherwise indicated, reference to a numerical parameter in the specification and attached claims is an approximation that may vary depending upon the property the numerical parameter represents and the measurement method used to determine the property. For example, the approximation may be at least that of significant digits, with each numerical parameter given to not more than significant digits. For example, the appropriate number of significant digits associated with a measurement method is a baseline for the degree of approximation. For numerical parameters reported in alternative units ordinary rounding techniques are applied. For example, ° C. and ° F. are alternative units and kilogram (kg) and pound (lb) are alternative units.

Whenever a numerical range with a lower and upper limit is disclosed, any number and any included range falling within the range is specifically disclosed. In particular, every range of values is to be understood to set forth every number and range encompassed within the broader range of values. Reference to "from n to m" indicates a closed range [n,m]. Reference to "from n to less than m" indicates a half open range [n,m). Reference to "greater than n and up to m" indicates another half open range (n,m]. Reference to "greater than a and less than b" indicates an open range (n,m).

Reference throughout this specification to "include" means include, but is not limited to. Likewise, reference through this specification to "includes" means includes, but is not limited to.

Reference throughout this specification to "one embodiment," "an embodiment," "an embodiment," "embodiments," "some embodiments," "certain embodiments," or similar language means that a particular feature, structure, or characteristic described in connection with the embodiment may be included in at least one embodiment of the present disclosure. Thus, these phrases or similar language throughout this specification may, but do not necessarily, all refer to the same embodiment.

To facilitate a better understanding of the disclosure, the following non-limiting examples are given. The following examples are not the only examples that could be given and are not intended to limit the scope of the disclosure, including the claims.

EXAMPLES

The examples illustrate the improved performance of dissolver fluid compositions of the present disclosure for dissolving mineral phases.

Example 1

This example illustrates compositions of mineral phases, where each mineral phase was a scale deposit. In particular, the mineral compositions of samples of scale deposit were determined using x-ray diffraction analysis. The results shown in Table 1 demonstrate that each extract from each sample contained primarily inorganic sulfate, in particular calcium sulfate.

TABLE 1

| XRD | Anhydrite (wt. %) | Quartz (wt. %) | Pyrite (wt. %) | Ankerite (wt. %) | Aragonite (wt. %) | Gypsum (wt. %) |
|---|---|---|---|---|---|---|
| XRD Mineralogical analysis of wellbore scale samples | | | | | | |
| Scale sample 1 | 97 | 2 | 1 | | | |
| Scale sample 2 - side 1 | 96 | | 4 | | | |
| Scale sample 2 - side 2 | 91 | | | | 6 | 3 |
| Scale sample 3 - side 1 | 100 | | | | trace | |
| Scale sample 3 - side 2 | 87 | | | 6 | | |

Table 1 shows the results of x-ray diffraction analyses of the samples. For samples 2 and 3, two sides of the samples were analyzed, one which had been in contact with equipment and the other which had been exposed to fluid. The scale samples were predominantly anhydrite calcium sulfate with trace amounts of other minerals, confirmed by x-ray diffraction analysis provided in Table 1. It will be understood that wt % is an abbreviation of weight %.

The results in Table 1 show the measured amounts in the samples of the minerals anhydrite, quartz, pyrite, ankerite, aragonite, and gypsum, as determined by x-ray diffraction analysis. It will be understood that anhydrite is anhydrous calcium sulfate, $CaSO_4$. It will be understood that quartz is silicon dioxide, $SiO_2$. It will be understood that pyrite is iron sulfide, $FeS_2$. It will be understood that ankerite is a carbonate mineral with the chemical formula $Ca(Fe,Mg,Mn)(CO_3)_2$. It will be understood that argonite is one of the crystalline forms of calcium carbonate, $CaCO_3$, where the lattice system of the crystal form is orthorhombic. It will be understood that gypsum is a hydrated calcium sulfate with the chemical formula $CaSO_4 \cdot 2H_2O$.

Example 2

This example illustrates compositions of complexing agent fluids. The formulations shown in Table 2 demonstrate that two complexing agent fluids were prepared based on PMIDA as the complexing agent. Each complexing agent fluid further contained sodium bicarbonate as a scale converting agent and potassium hydroxide as a pH adjusting agent, and differing from each in the absence (Fluid A) or presence (Fluid B) of organochloride as an auxiliary agent.

TABLE 2

Compositions of Chelating Agent Fluids

|  |  | Fluid A | Fluid B |
| --- | --- | --- | --- |
| Chelating agent | PMIDA | 20% w/v | 20% w/v |
| Scale converting agent | Sodium Bicarbonate | 10% w/v | 10% w/v |
| pH adjusting agent | 45% KOH (w/w) | to pH 9.5 | to pH 9.5 |
| Synergistic agent | Chloroacetic acid | 5% w/v | 0 |
| Base fluid | Water | Balance to make 100 parts total volume | Balance to make 100 parts total volume |

Table 2 shows the compositions of the two different complexing agent fluids. Both compositions A and B were 20% w/v PMIDA, and 10% w/v sodium bicarbonate. Composition B additionally contained 5% w/v of chloroacetic acid, an organochloride. Composition A did not contain chloroacetic acid. For each composition, a 45 wt % potassium hydroxide (KOH) solution was added to each composition in an amount to provide a pH of 9.5. The balance of each composition was water to make 100 parts total volume. It will be understood that % w/v is an abbreviation of % weight/volume. The % w/v is a concentration and was measured in units of g/100-mL. Composition A was 20% w/v PMIDA, 10% w/v sodium bicarbonate, 45% wt KOH, 5% w/v organochloride, and water to make 100 parts total volume. Composition B is 20% w/v PMIDA, sodium bicarbonate 10% w/v sodium bicarbonate, 45% wt KOH, and water to make 100 parts total volume.

Example 3

This example illustrates compositions of candidates tested as wettability modifiers.

Table 3 shows the candidate wettability modifier formulations. Each formulation included DI water and ethanol. The DI water is illustrative of an aqueous base and the ethanol is illustrative of an alcohol. Each formulation included no solvent, Solvent 1 or Solvent 2. Solvent 1 contains dimethyl 2-methylglutarate. Solvent 1 is illustrative of alkylesters of alkylated dibasic esters (Kb value 45-90). Solvent 2 contains N-dodecyl-2-pyrrolidone. Solvent 2 is illustrative of N-alkyl pyrrolidinones (Kb value 91-130). Each formulation included one of the following surfactants: Surfactant 1, Surfactant 2, Surfactant 3, Surfactant 4. Surfactant 1 contains a dodecylbenzene sulfonate-salt (−). Surfactant 1 is illustrative of a linear alkyl benzene sulfonate surfactant. Surfactant 2 contains a diethanolamide of fatty carboxylic acids (±). Surfactant 3 contains a C12-C16 branched alchohol, ethoxylated with 5-15 moles of ethylene oxide (±). Surfactant 4 contains a benzalkonium chloride (+). The solvents and surfactants are commercially available from suitable chemical manufacturers.

TABLE 3

Candidate wettability modifier formulations

| Formulation | wt. % Deionized Water | wt. % Ethanol | Solvent | wt. % Solvent | Surfactant | wt. % Surfactant |
| --- | --- | --- | --- | --- | --- | --- |
| C-1 | 35 | 40 | none | — | Surf. 1 | 25 |
| C-2 | 35 | 40 | none | — | Surf. 2 | 25 |
| C-3 | 35 | 40 | none | — | Surf. 3 | 25 |
| C-4 | 35 | 40 | none | — | Surf. 4 | 25 |
| C-5 | 30 | 25 | Solv. 1 | 20 | Surf. 1 | 25 |
| C-6 | 25 | 40 | Solv. 1 | 10 | Surf. 2 | 25 |
| C-7 | 25 | 40 | Solv. 2 | 10 | Surf. 1 | 25 |
| C-8 | 25 | 40 | Solv. 1 | 10 | Surf. 3 | 25 |
| C-9 | 25 | 40 | Solv. 1 | 10 | Surf. 4 | 25 |
| Control | 60 | 40 | none | — | none | — |

Example 4

This example illustrates contacting a dissolver fluid with a mineral phase. The respective dissolver fluids were applied to three scale samples in equivalent sample mass to fluid ratios. When it was possible, 0.5 g of mineral phase was mixed with 50 ml of dissolver fluid. When the exact quantity of 0.5 g of mineral phase was not available, the quantity of dissolver fluid was extrapolated from the amount applied to 0.5 g mineral phase to replicate the same mass-to-volume ratio of 0.5 g mineral phase to 50 mL of dissolver fluid. The scale samples were 97-99% calcium sulfate anhydrite. The amounts are shown in Table 8. The fluid and mineral phase sample was loaded under atmospheric conditions into a loosely capped glass jar, and immediately placed in a water bath set to 200° F. (93° C.) for 1 hour or 2 hours under static conditions. The jar was removed after the designated time elapsed and any remaining sample was removed and weighed.

Example 5

This example illustrates the performance of candidate dissolver fluids for dissolving mineral phases, tested using the procedure of Example 4. To produce the samples that were tested with the procedure of Example 4 to give the results described in Example 5, 100 mL of chelating agent Fluid A of Example 2 and 2 mL of candidate wettability modifier formulation of Example 3 were combined to produce the candidate dissolver fluid. The test results are shown in Table 4, with each dissolver fluid identified by the respective candidate wettability modifier used in preparing the corresponding dissolver fluid.

TABLE 4

Mineral phase dissolution

| Formulation | % Dissolution | |
|---|---|---|
| | 1 hour | 2 hour |
| C-1 | 28.73% | 59.87% |
| C-2 | 26.62% | 54.79% |
| C-3 | 21.71% | 50.56% |
| C-4 | 40.56% | 72.36% |
| C-5 | 45.99% | 84.89% |
| C-6 | 21.08% | 61.20% |
| C-7 | 23.84% | 61.04% |
| C-8 | 26.97% | 52.26% |
| C-9 | 30.64% | 55.56% |
| Control | 42.67% | 68.35% |

The results given in Table 4 show superior performance from formulation C-5. In particular, this formulation provided improved performance when compared to the other formulations and to the control. Further, of the candidate formulations, only formulation C-5 resulted in higher dissolution of the calcium sulfate scale, illustrative of a mineral phase, than the control. Formulation C-1 is illustrative of inventive wettability formulation 1. The results for formulation C-5 shown in Table 4 demonstrate that wettability modifiers containing a linear alkyl benzene sulfonate salt, illustrative of an anionic alkyl sulfonate or an anionic aryl sulfonate surfactant, improve the performance of PMIDA, illustrative of a phosphonoalkyl aminopolycarboxylic acid chelating agent, for removing the mineral phase. The results for formulation 5, as compared to formulations C-1 and C-7, demonstrate that the linear alkyl benzene sulfonate surfactant, illustrative of an anionic alkyl sulfonate or an anionic aryl sulfonate surfactant, provides greater improvement when dimethyl 2-methylglutarate, illustrative of a dibasic ester solvent, is included in the wettability modifier. Further, the results for formulation C-5 demonstrate approximately 46% mineral phase dissolution at 1 hour and approximately 85% mineral phase dissolution at 2 hours, illustrating, e.g. by extrapolation, removing at least 90% of the mineral phase within between 0.5 and 72 hours, more particularly between 0.5 and 8 hours, still more particularly between 0.5 and six hours.

SPECIFIC EMBODIMENTS

Methods of removing an oil wet mineral phase comprising an inorganic sulfate from a surface may include contacting the mineral phase with an aqueous dissolver fluid comprising a phosphonoalkyl aminopolycarboxylic acid chelating agent, a wettability modifier, a pH-adjusting agent, a scale converting agent and water, wherein the wettability modifier comprises a dibasic ester and a surfactant, wherein the surfactant comprises one or more of an anionic alkyl sulfonate or an anionic aryl sulfonate; and removing the oil wet mineral phase from the surface with the aqueous dissolver fluid.

The methods may include the embodiments of any preceding paragraph or combination thereof and further include removing a hydrocarbon phase from a surface of the mineral phase with the aqueous dissolver fluid.

The methods may include the embodiments of any preceding paragraph or combination thereof and further include wherein the mineral phase is contacted with the aqueous dissolver fluid only in a single step dissolving process.

The methods may include the embodiments of any preceding paragraph or combination thereof and further include wherein at least 50% of the mineral phase is removed within between 0.5 and 72 hours.

The methods may include the embodiments of any preceding paragraph or combination thereof and further include wherein at least 50% of the mineral phase is removed within between 0.5 and 8 hours.

The methods may include the embodiments of any preceding paragraph or combination thereof and further include wherein the mineral phase comprises calcium sulfate.

The methods may include the embodiments of any preceding paragraph or combination thereof and further include wherein the surfactant comprises an anionic alkyl sulfonate.

The methods may include the embodiments of any preceding paragraph or combination thereof and further include wherein the anionic alkyl sulfonate comprises a linear alkyl benzene sulfonate.

The methods may include the embodiments of any preceding paragraph or combination thereof and further include wherein the dibasic ester is selected from the group consisting of dimethyl 2-methylglutarate, 1-dodecyl-2-pyrrolidinone, N—$(C_2H_4)$—$CH_3$-pyrrolidinone wherein n is from about 6 to about 12, dimethyl succinate, dimethyl glutarate, dimethyl adipate, dimethyl-2-methyl adipate and combinations thereof.

The methods may include the embodiments of any preceding paragraph or combination thereof and further include wherein the dibasic ester comprises dimethyl 2-methylglutarate.

The methods may include the embodiments of any preceding paragraph or combination thereof and further include wherein the phosphonoalkyl aminopolycarboxylic acid chelating agent comprises a phosphorylated aminopolycarboxylic acid.

The methods may include the embodiments of any preceding paragraph or combination thereof and further include wherein the phosphorylated aminopolycarboxylic acid comprises PMIDA.

For example methods of may include removing a hydrocarbon phase from the mineral phase with the aqueous dissolver fluid; wherein the mineral phase is contacted with the aqueous dissolver fluid only in a single step dissolving process; wherein at least 50% of the mineral phase is removed within between 0.5 and 8 hours; wherein the mineral phase comprises calcium sulfate; wherein the anionic salt comprises a linear alkyl benzene sulfonate surfactant; wherein the wettability modifier further comprises a solvent comprising dimethyl 2-methylglutarate; and wherein the phosphonoalkyl aminopolycarboxylic acid chelating agent comprises PMIDA.

Compositions for removing a mineral phase of inorganic sulfate scale may include a phosphonoalkyl aminopolycarboxylic acid chelating agent; a wettability modifier comprises a dibasic ester and a surfactant, wherein the surfactant comprises one or more of an anionic alkyl sulfonate or an anionic aryl sulfonate; a pH-adjusting agent; a scale converting agent; and water.

The compositions may include the embodiments of any preceding paragraph or combination thereof and further include wherein the surfactant comprises an anionic alkyl sulfonate.

The compositions may include the embodiments of any preceding paragraph or combination thereof and further include wherein the anionic alkyl sulfonate comprises a linear alkyl benzene sulfonate.

The compositions may include the embodiments of any preceding paragraph or combination thereof and further include the dibasic ester is selected from the group consisting of dimethyl 2-methylglutarate, 1-dodecyl-2-pyrrolidinone, N—($C_2H_4$)—$CH_3$-pyrrolidinone (wherein n is from about 6 to about 12), dimethyl succinate, dimethyl glutarate, dimethyl adipate, dimethyl-2-methyl adipate and combinations thereof.

The compositions may include the embodiments of any preceding paragraph or combination thereof and further include wherein the dibasic ester comprises dimethyl 2-methylglutarate.

The compositions may include the embodiments of any preceding paragraph or combination thereof and further include wherein the phosphonoalkyl aminopolycarboxylic acid chelating agent comprises a phosphorylated aminopolycarboxylic acid.

The compositions may include the embodiments of any preceding paragraph or combination thereof and further include wherein the phosphorylated aminopolycarboxylic acid comprises PMIDA.

The embodiments disclosed, including the examples, should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

What is claimed is:

1. A method of removing an oil wet mineral phase comprising an inorganic sulfate from a surface, comprising:
   contacting the oil wet mineral phase with an aqueous dissolver fluid comprising a phosphonoalkyl aminopolycarboxylic acid chelating agent, a wettability modifier, a pH-adjusting agent, a scale converting agent and water, wherein the wettability modifier comprises a dibasic ester and a surfactant, wherein the surfactant comprises one or more of an anionic alkyl sulfonate or an anionic aryl sulfonate, wherein the dibasic ester is an alkylester of alkylated dibasic esters; and
   removing at least 90% of the oil wet mineral phase from the surface with the aqueous dissolver fluid within between 0.5 and 72 hours.

2. The method of claim 1, further comprising removing a hydrocarbon phase from a surface of the oil wet mineral phase with the aqueous dissolver fluid.

3. The method of claim 2, wherein the oil wet mineral phase is contacted with the aqueous dissolver fluid only in a single step dissolving process.

4. The method of claim 1, wherein at least 50% of the oil wet mineral phase is removed within between 0.5 and 8 hours.

5. The method of claim 1, wherein the oil wet mineral phase comprises calcium sulfate.

6. The method of claim 1, wherein the surfactant comprises an anionic alkyl sulfonate.

7. The method of claim 6, wherein the anionic alkyl sulfonate comprises a linear alkyl benzene sulfonate.

8. The method of claim 1, wherein the dibasic ester is selected from the group consisting of dimethyl 2-methylglutarate, dimethyl succinate, dimethyl glutarate, dimethyl adipate, dimethyl-2-methyl adipate and combinations thereof.

9. The method of claim 8, wherein the dibasic ester comprises dimethyl 2-methylglutarate.

10. The method of claim 1, wherein the phosphonoalkyl aminopolycarboxylic acid chelating agent comprises a phosphorylated aminopolycarboxylic acid.

11. The method of claim 10, wherein the phosphorylated aminopolycarboxylic acid comprises PMIDA.

12. The method of claim 1, further comprising:
   removing a hydrocarbon phase from the oil wet mineral phase with the aqueous dissolver fluid;
   wherein the mineral phase is contacted with the aqueous dissolver fluid only in a single step dissolving process;
   wherein at least 50% of the mineral phase is removed within between 0.5 and 8 hours;
   wherein the mineral phase comprises calcium sulfate;
   wherein the anionic salt comprises a linear alkyl benzene sulfonate surfactant;
   wherein the wettability modifier further comprises a solvent comprising dimethyl 2-methylglutarate; and
   wherein the phosphonoalkyl aminopolycarboxylic acid chelating agent comprises PMIDA.

* * * * *